United States Patent [19]

Maeda et al.

[11] Patent Number: 5,189,570
[45] Date of Patent: Feb. 23, 1993

[54] BISTABLE MAGNETIC HEAD ADVANCING/RETRACTING DEVICE FOR ROTATING MAGNETIC RECORDING MEDIUM

[75] Inventors: Yutaka Maeda; Kiyotaka Kaneko; Izumi Miyake; Yoshio Nakane; Hiroshi Shimaya, all of Tokyo, Japan

[73] Assignee: Fuji Photo Film Co, Ltd., Kanagawa, Japan

[21] Appl. No.: 746,186

[22] Filed: Aug. 15, 1991

Related U.S. Application Data

[63] Continuation of Ser. No. 314,112, Feb. 23, 1989, abandoned.

[30] Foreign Application Priority Data

Feb. 23, 1988 [JP] Japan .................................. 63-38700

[51] Int. Cl.$^5$ .............................................. G11B 5/54
[52] U.S. Cl. ...................................... 360/75; 360/105
[58] Field of Search ................ 360/69, 75, 78.04, 103, 360/105, 106

[56] References Cited

U.S. PATENT DOCUMENTS

| | | | |
|---|---|---|---|
| 4,012,791 | 3/1977 | Bleiman | 360/105 |
| 4,120,010 | 10/1978 | Mitsuya et al. | 360/105 |
| 4,689,698 | 8/1987 | Ishikawa et al. | 360/69 |
| 4,786,995 | 11/1988 | Stupeck et al. | 360/75 |
| 4,835,642 | 5/1989 | Furukawa et al. | 360/105 |
| 4,841,397 | 6/1989 | Maeda | 360/105 |

Primary Examiner—Jerry Smith
Assistant Examiner—Steven R. Garland
Attorney, Agent, or Firm—Birch, Stewart, Kolasch & Birch

[57] ABSTRACT

A magnetic head advancing apparatus which advances a magnetic head to be brought into contact with a magnetic recording medium (head loading) in response to a latch-type solenoid when a power supply switch is closed. The magnetic head is separated from the magnetic recording medium (head unloading) in response to a latch-type solenoid when the power supply switch is opened, when the power supply voltage drops below a predetermined level, or when the power supply (a battery) is ejected from the apparatus. This makes it possible to prevent local permanent deformation of a magnetic disk caused by prolonged abutting contact between the magnetic head and the magnetic disk.

14 Claims, 8 Drawing Sheets

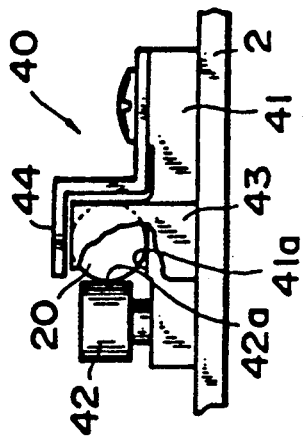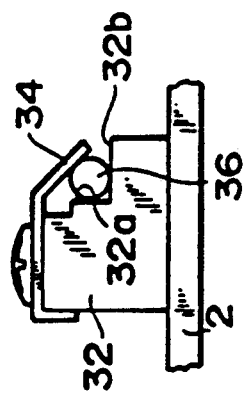

BISTABLE MAGNETIC HEAD ADVANCING/RETRACTING DEVICE FOR ROTATING MAGNETIC RECORDING MEDIUM

This application is a continuation, of application Ser. No. 07/314,112 filed on Feb. 23, 1989, now abandoned.

BACKGROUND OF THE INVENTION

1. Field of the Invention

This invention relates to a magnetic recording/playback apparatus for a rotating magnetic recording medium (hereinafter referred to as a magnetic disk) capable of advancing a magnetic head in a direction to contact the magnetic disk in order to write a signal on any desired track or read a recorded signal from any desired track, and of retracting the magnetic head in a direction away from the magnetic disk.

2. Description of the Background Art

Electronic still camera systems have recently been developed. These systems combine an imaging device such as a solid state imaging element or image pickup tube with a recorder that employs an inexpensive magnetic disk of comparatively large storage capacity as a storage medium. The systems operate by electronically imaging a subject, recording a still picture of the subject on the magnetic disk and reproducing the recorded picture by a separately provided television system or printer. A video magnetic recording system has also been realized in which a still picture recorded on a visible recording medium such as ordinary film or photographic paper is imaged and recorded on a magnetic disk.

In systems of this kind, a video signal is recorded on the magnetic disk or read from the magnetic disk not by merely contacting the magnetic recording/playback head with the recording surface of the disk lightly but by pressing the head against the disk surface so strongly that the disk is partially deformed. Since the magnetic disk has some flexibility and therefore returns to its original state even when somewhat deformed, no problems are encountered even though the magnetic head is pressed against the rotating magnetic disk during recording or playback. However, when rotation of the magnetic disk is halted and the magnetic head is held in abutting contact with one location on the stationary magnetic disk, the portion of the disk in contact with the magnetic head becomes permanently deformed and is scarred or left with an impression of the head if such contact is allowed to continue for an extended period of time (e.g. for several hours to several days).

In an effort to solve this problem, devices of various types have been proposed for loading and unloading the magnetic head, namely for moving the magnetic head in a direction orthogonal to the surface of the disk to bring the head into contact with the disk (loading), and for moving the head away from the disk (unloading). Many of these loading/unloading devices are designed to repeat the loading/unloading of the magnetic head quite frequently, namely whenever a signal is recorded on or played back from a magnetic disk, whenever rotation of the magnetic disk starts, or whenever the magnetic head is transferred from one track to the next. Consequently, it is required that the loading/unloading device have a great amount of durability. Another problem that results is the occurrence of malfunction as due to wear, which develops comparatively quickly.

SUMMARY OF THE INVENTION

An object of the invention is to provide a magnetic disk magnetic recording/playback apparatus which makes it possible to prevent a magnetic disk from being left with the impression of a magnetic head, and in which there are almost no ill effects brought about by frequent loading/unloading of the magnetic head.

According to the present invention, the foregoing object is attained by providing a magnetic recording/playback apparatus for a magnetic disk, comprising a bistable magnetic head advancing/retracting device responsive to supply of driving power for advancing a magnetic head in a direction to contact a rotating magnetic disk and retracting the magnetic head in a direction away from the magnetic disk, and for stably holding the magnetic head at an advanced position or retracted position in the absence of a supply of driving power. Further includes is a means for detecting a state in which power having enough voltage to drive the magnetic head advancing/retracting device is capable of being supplied, and for detecting a state in which the supplied power is capable of being cut off, and means responsive to detection performed by the detecting means for executing control in such a manner that the magnetic head is advanced when the state is attained in which power is capable of being supplied for driving the magnetic head advancing/retracting device, and is retracted when the state is attained in which the supplied power is capable of being cut off.

The types of magnetic recording/playback apparatus to which the invention can be applied include an apparatus for magnetically recording a predetermined signal on a magnetic disk, an apparatus for reading and playing back a signal from a magnetic disk, and an apparatus having the dual functions of recording and playback.

The state in which power having enough voltage to drive the magnetic head advancing/retracting device is capable of being supplied is attained when battery output voltage is above a predetermined voltage and, moreover, a power supply switch is turned on. At such time the magnetic head is advanced to contact the magnetic disk. In other words, a state is attained in which recording/playback is possible.

The state in which the power supply is capable of being cut off is attained when the power supply switch is turned off, when the battery is expended and its output voltage drops below a predetermined voltage, when the battery is removed from the apparatus, etc. In cases such as these, the magnetic head is retracted.

Permanent deformation of a magnetic disk by a magnetic head occurs when the head remains in abutting contact with one point on the disk for an extended period of time with the disk at rest. This is likely to occur when a state is attained in which the power supply can be cut off, such as when the recording/playback apparatus is left with the power supply switch turned off. According to the invention, the magnetic head is retracted and parted from the magnetic disk upon attainment of the state in which the power supply is capable of being cut off. As a result, permanent deformation of the disk by the head does not occur. Since the magnetic head advancing/retracting device holds the retracted head stably at a retracted position without the passage of current, the magnetic head resides at the retracted position even when the supply of power is cut off.

When the state is attained in which power can be supplied, namely when there is a possibility of performing recording/playback, the magnetic head is loaded to contact the magnetic disc. As a result, a state is attained in which recording/playback becomes possible.

Since the loading/unloading of the magnetic head is performed only a number of times approximately equivalent to the number of times the power supply is turned on and off, the magnetic head advancing/retracting device is not driven frequently. The result is higher reliability.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 4 is a view as seen from line IV—IV of FIG. 2;

FIG. 5 is a view as seen from line V—V of FIG. 2;

FIG. 6 is a view as seen from line VI—VI of FIG. 2;

FIG. 7 is a sectional view taken along line VII—VII of FIG. 2;

FIGS. 9 and 10 illustrate a main battery in a loaded state, in which FIG. 9 is a sectional view and FIG. 10 a plan view;

DESCRIPTION OF THE PREFERRED EMBODIMENT

A preferred embodiment of the present invention will now be described with reference to the drawings.

Figure 1:
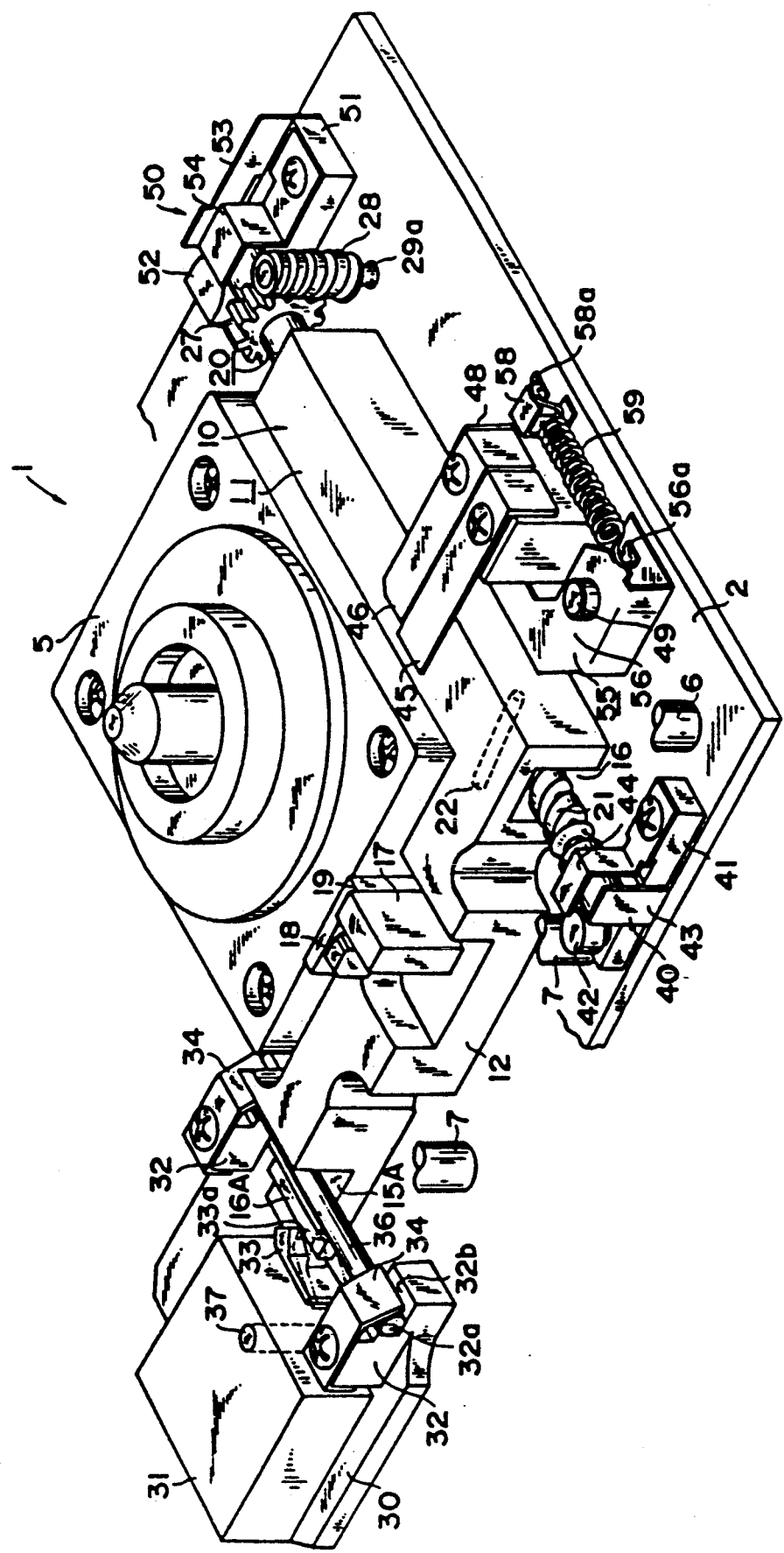
FIG. 1 is a perspective view illustrating the general features of a recording/playback section of a magnetic recording/playback apparatus.
Figure 2:
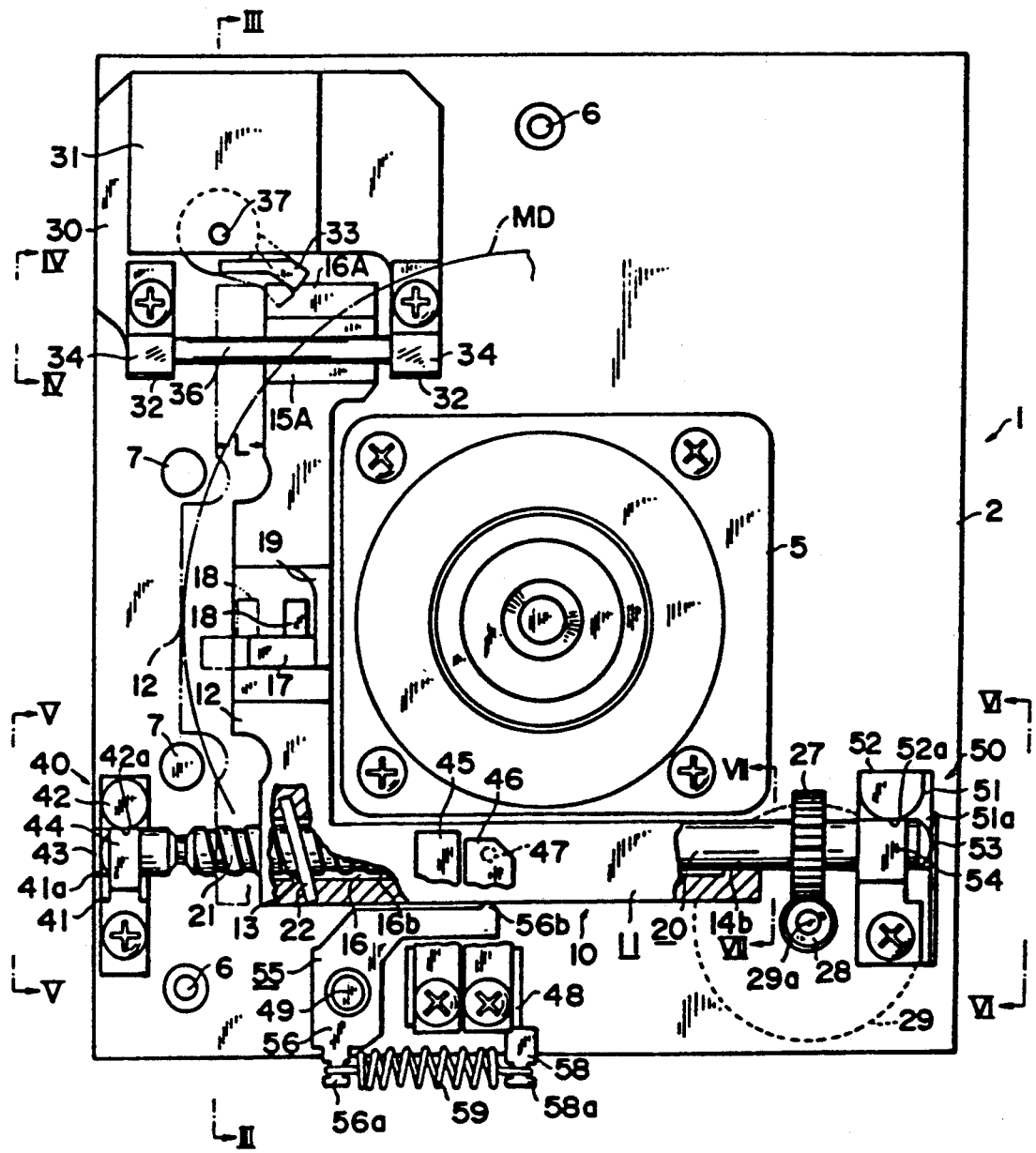
FIG. 2 is a plan view of the recording/playback section.
Figure 3:
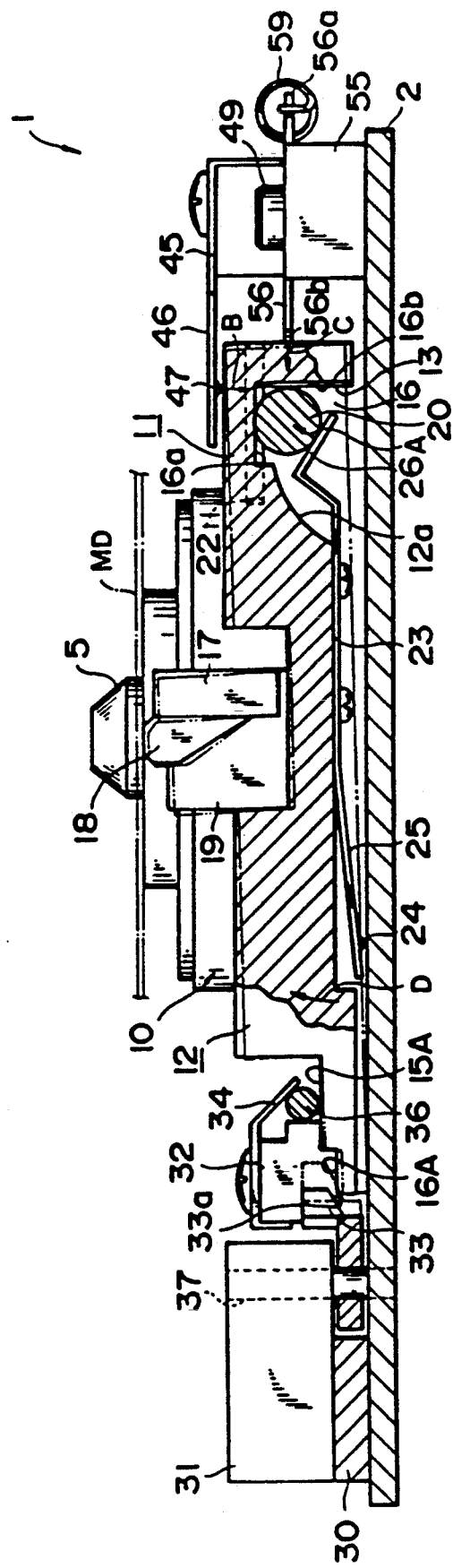
FIG. 3 is a sectional view taken along line III—III of FIG. 2.

FIG. 1 is a perspective view illustrating the general features of a recording/playback section of a magnetic recording/playback apparatus, FIG. 2 is a plan view of the recording/playback section, FIG. 3 is a sectional view taken along line III—III of FIG. 2, FIG. 4 is a view as seen from line IV—IV of FIG. 2, FIG. 5 is a view as seen from line V—V of FIG. 2, FIG. 6 is a view as seen from line VI—VI of FIG. 2, and FIG. 7 is a sectional view taken along line VII—VII of FIG. 2.

A magnetic disk MD is provided with a plurality (e.g. 50) of circular, concentrically disposed tracks. A guard band is provided between mutually adjacent tracks. By way of example, track width is 60 μm, guard band width 40 μm and track pitch 100 μm.

The 50 tracks of the magnetic disk MD are assigned consecutive track numbers No. 1 to No. 50 starting from the outermost track. A home position HP is situated on the outer side of the No. 1 track, and an end position EP is situated on the inner side of the No. 50 track.

As shown in FIGS. 1, 2 and 3, a recording/playback section 1 is assembled on a base plate 2. Mounted substantially at the center of the base plate 2 is a spindle motor 5 for chucking and rotating the magnetic disk MD. Two pins 6 and two pins 7 are erected on the base plate 2. The pins 6 are for positioning a floppy case within which the magnetic disk MD is retained in freely rotatable fashion. The floppy case is positioned by inserting the pins 6 into positioning holes located in the case. The pins 7 are for positioning a limiting plate holder (not shown) to which there is fixed a limiting plate 68, described below, opposing a magnetic head 18 from the opposite side of the magnetic disk MD.

A lead screw 20 having a threaded portion 21 formed on one end portion thereof is so provided on the base plate 2 as to be horizontal and freely rotatable. The lead screw 20 is freely rotatably supported at both its ends by bearings 40, 50. The bearing 40 is equipped with a bearing pad 41 having a flat horizontal bearing surface 41a and fixed to the base plate 2, and a bearing column 42 having a vertical bearing surface 42a which is circular (see FIG. 5). The bearing 50 is equipped with a bearing pad 51 having a flat horizontal bearing surface 51a and fixed to the base plate 2, and a bearing column 52 having a vertical bearing surface 52a which is semi-circular (see FIG. 6). As will be set forth in detail hereinbelow, both end portions of the lead screw 20, having circular circumferential surfaces, are brought into pressured contact with the horizontal bearing surfaces 41a, 51a and vertical bearing surfaces 42a, 52a of the bearings 40, 50 by spring force. These end portions are received in a freely rotatable manner owing to linear contact with the bearing surfaces 41a, 51a, 42a, 52a. A stopper 43 is attached to the bearing 40, and a leaf spring 53 is attached to the bearing 50. The lead screw 20 is prevented from moving longitudinally by abutting the leaf spring 53 against a hemispherically formed end face of the lead screw 20 while the other end face of the lead screw is urged against the stopper 43. The bearings 40, 50 are provided with respective stoppers 44, 54, which prevent the lead screw 20 from falling out. These stoppers have portions which extend over the lead screw 20 to perform this function. A small gap is provided between the lead screw 20 and each of the stoppers 44, 54.

A worm gear 27 is secured to the lead screw 20 on the side thereof opposite the threaded portion 21. The worm gear 27 meshes with a worm 28 fixed to an output shaft 29a of a stepping motor 29 (indicated by the dashed line in FIG. 2). The stepping motor 29 is secured to the underside of the base plate 2, with its output shaft 29a being passed loosely through a hole in the base plate 2 so as to project from its top side. The lead screw 20 is rotated by driving the stepping motor 29.

A head carriage 10 is composed of an integrally formed sliding portion 11 and head mounting portion 12. These portions are joined to each other at one end thereof so as to form an L-shaped configuration when viewed from a plane.

The sliding portion 11 is formed to have a recess 16 longitudinally thereof for receiving the lead screw 20 passed therethough. The recess 16 on the side of a spindle 5 is open except for the end of the sliding portion 11 to which the head mounting portion 12 is joined. Naturally, the lower side of the recess 16 is open along its entire length. The recess 16 has a downwardly directed horizontal surface 16a and an inwardly directed vertical surface 16b. One end of the sliding portion 11 situated on the side of the worm gear 27 is formed to include portions projecting somewhat beyond the two surfaces 16a, 16b of the recess 16. These projecting portions have a flat horizontal sliding surface 14a and a flat vertical sliding surface 14b which intersect each other at right angles (see FIG. 7). The sliding surfaces 14a, 14b are so disposed as to oppose the bearing surfaces 51a, 52a of the bearing 50 (and the surfaces 41a, 42a of bearing 40).

A needle 22 which engages with the thread bottom of the threaded portion 21 of lead screw 20 is embedded in the other end of the sliding portion 11, namely the end joined to the head mounting portion 12. The needle 22 crosses the upper portion of the recess 16 obliquely and lies substantially parallel to the horizontal surface 16a of the recess 16. The vertical surface 16b of the recess 16 is provided with a protruding sliding portion 13 abutting against the threads of the threaded portion 21 of lead screw 20. This protruding sliding portion 13 extends in the vertical direction. Though it is preferred that the protruding sliding portion 13 be situated at a thread adjacent the thread bottom of the threaded portion 21 engaged by the needle 22, it is not always necessary to be adjacent. As will be described below, the head carriage 10 and lead screw 20 are biased by springs in such a manner that the sliding surfaces 14a, 14b abut against the peripheral surface of the one end of lead screw 20 devoid of the threaded portion 21 and the needle 22 and protruding sliding portion 13 abut against the thread bottom and thread, respectively, of the threaded portion 21 at the other end of the lead screw 20.

The head carriage 10 is formed to include a recess near the middle of the head mounting portion 12, the recess being provided with an upwardly projecting mounting piece 19. A magnetic head 18 is fixed to the mounting piece 19 via a mounting member 17. (Two magnetic heads 18 are provided in an arrangement in which frame recording is possible.)

The end of the head mounting portion 12 opposite its joint with the sliding portion 11 is provided with steps formed to have horizontal surfaces 15A and 16A. The horizontal surface 16A is formed at the tip of the head mounting portion 12. A rod 36 both ends of which are supported by pads 32 integrally molded with a seat 30 extends across the horizontal surface 15A. The seat 30 is secured to the base plate 2. The pad 32 is formed to have a vertical surface 32a and a horizontal surface 32b which intersect each other at right angles (see FIG. 4). The rod 36 is fixed by being urged by a leaf spring 34, which is attached to the pad 32, so as to abut against the surfaces 32a, 32b. As will be set forth below, the abovementioned end of the head mounting portion 12 is biased upwardly by the force of a leaf spring 23 so that the horizontal surface 15A is in abutting contact with the rod 36.

A latch-type solenoid 31 is secured to the seat 30. The solenoid 31 has an output shaft 37 which, by way of example, is rotated through +10° by positive pulses and through −10° by negative pulses. Fixed to the output shaft 37 is an oscillating member 33 the tip whereof is provided with an upwardly projecting portion. The lower surface of this projecting portion is formed to have a slanted face 33a for engaging the horizontal surface 16A of the head carriage 10 at an operating position (see FIG. 3). The latch-type solenoid 31 is advantageous in that power consumption can be reduced since drive is possible with a pulsed current. By driving the latch-type solenoid 31, the oscillating member 33 is made to assume an operating position, which is indicated by the phantom lines, or a stop position, which is indicated by the solid lines. In the operating and stop positions, the latch-type solenoid 31 is held in stable fashion even without being energized. In other words, it will suffice to pass a current through the solenoid only when the oscillating member 33 is shifted between the operating position and the stop position.

As shown in FIG. 3, the bottom side of the head mounting portion 12 is formed to include a recess to which the leaf spring 23 is secured at its central portion. One end 26 of the leaf spring 23 is bent into a generally L-shaped configuration to abut against the threaded portion 21 of the lead screw 20 diagonally from below. A force acts to urge the lead screw 20 obliquely and upwardly, as indicated by the arrow A. The lower surface at the tip of the other end 25 of the leaf spring 23 is provided with a projection 24 which abuts against the base plate 2. As a result, a force acts to urge upwardly the end of the head mounting portion 12 provided with the horizontal surface 15A, as indicated by the arrow D in FIG. 3. This causes the horizontal surface 15A to abut against the rod 36. The lower surface of the head mounting portion 11 of head carriage 10 is formed to have a cut-out 12a leading to the recess 16. This assures that the end 26 of leaf spring 23 will function.

Another leaf spring 46 is attached at one end to a mounting base 48 provided on the base plate 2. A protrusion 47 is provided on the underside of the leaf spring 46 at its other end. The protrusion 47 abuts against the upper surface of the sliding portion 11 of head carriage 10 substantially at its mid-section in the longitudinal direction. The position at which the protrusion 47 contacts the sliding portion 11 is somewhat outward of a point exactly above the lead screw 20. As indicated by the arrow B in FIG. 3, a perpendicular force acts upon the sliding portion 11 of the head carriage 10. A stopper 45 is attached to the mounting base 48 at a position alongside the leaf spring 46. A slight gap exists between the stopper 45 and the sliding portion 11.

With reference to FIGS. 1 and 2, a shaft 49 is erected on the base plate 2 adjacent the mounting base 48 on the base plate 2. The shaft 49 is provided with an urging lever 55 that is free to oscillate in the horizontal direction. The lever 55 is formed to have an inverted U-shaped vertical cross section. The urging lever 55 has an upper surface piece 56 one end of which is extended horizontally along the side face of the sliding portion 11 of head carriage 10 up to a point near where the protrusion 47 of leaf spring 46 contacts the head carriage 10. The tip of this extended end is formed to have a projection 56b projecting horizontally toward the sliding portion 11 of the head carriage 10 and contacting the side face of the sliding portion 11. The positions at which the protrusion 47 of leaf spring 46 and the projection 56b of urging lever 55 contact the sliding portion 11 lie on the same straight line, which perpendicularly intersects the direction of movement of head carriage 10. The other end portion of the upper surface piece 56 of urging lever 55 is formed to have a spring mounting portion 56a. On the other hand, a mounting member 58 formed to have a spring mounting portion 58a is secured to the mounting base 48. A tension spring 59 is stretched between the mounting portions 56a, 58a. Accordingly, the urging lever 55 is biased by the spring 59 so that a horizontal force directed toward the lead screw 20 as indicated by arrow C in FIG. 3 acts upon the sliding portion 11 of head carriage 10.

Owing to the strong downwardly directed vertical force B due to the leaf spring 46 and the horizontal force C due to the urging lever 55, the sliding surfaces 14a, 14b of the sliding portion 11 of head carriage 10 abut against the lead screw 20, the protruding sliding portion 13 abuts against the threads of the threaded portion 21 and the lead screw 20 abuts against the horizontal bearing surfaces 41a, 51a and vertical bearing surfaces 42a, 52a of the bearings 40, 50 at both its ends. The needle 22 naturally engages with the thread bottom of the threaded portion 21 of lead screw 20. The force A due to the end portion 26 of leaf spring 23 urges the lead screw 20 against the sliding portion 11 in a direction substantially opposite that of the result force of forces B and C, thereby establishing reliable abutting contact between the lead screw 20 and the sliding portion 11.

When the lead screw 20 is rotated, the head carriage 10 is fed in the axial direction of the lead screw 20 since the needle 22 is engaged with the threaded portion 21. The guiding of the head carriage 10 is carried out in positive fashion by virtue of the abutting contact between the sliding surfaces 14a, 14b and the lead screw 20, the abutting contact between the protruding sliding portion 13 and the threads, and the abutting contact between the horizontal surface 15A and rod 36. It goes without saying that since the head carriage 10 is fed with rotation of the lead screw 20, the protruding sliding portion 13 abuts against the threads of the threaded portion 21 at all times. The range of reciprocating movement of the head carriage 10 is indicated at L in FIG. 2.

In an ordinary state in which a signal can be recorded ion the magnetic disk MD or played back form the magnetic disk MD by the magnetic head 10, the head carriage 10 is maintained in the horizontal condition by the force of leaf spring 23 and the magnetic head 18 is in intimate contact with the surface of the magnetic disk MD, as clearly shown in FIG. 3. This represents the head in the loaded state. At this time the oscillating member 33 of the latch-type solenoid 31 is standing by at the stop position, which is indicated by the solid line in FIG. 2.

When the latch-type solenoid 31 is energized, the oscillating member 33 is turned to assume the operating position shown by the phantom liens. As a result, the slanted face 33a of the oscillating member 33 and the edge of the horizontal surface 16A of head carriage 10 come into contact (see FIG. 3), so that the oscillating member 33 urges this edge portion of the head carriage 10 downward. Consequently, the head carriage 10 is turned slightly about the lead screw 20, as shown by the phantom lines in FIG. 3, so that the head carriage 10 assumes a tilted attitude and separates the magnetic head 18 from the magnetic disk MD. In other words, the head is unloaded. The magnetic head 18 is thus retracted.

This operation to retract the magnetic head from the magnetic disk MD is possible when the head carriage 10 is at any position within the range L of reciprocating movement. When the stop position indicated by the solid lines prevails, the oscillating member 33 of the solenoid 31 will not act upon the edge of the horizontal surface 16A regardless of the position of head carriage 10.

When the latch-type solenoid 31 is rotated in the reverse direction to return the oscillating member 33 to the stop position, the head carriage 10, under the biasing forces of the leaf springs 23, 46, is restored to an attitude in which the magnetic head 18 contacts the magnetic disk MD.

In the above-described embodiment, the head carriage 10 is formed to have the recess 16 into which the lead screw 20 is fitted. However, an alternative arrangement is possible wherein the head carriage 10 is provided with a guide portion having a through-hole through which the portion of the lead screw 20 other than threaded portion 21 is passed in a freely rotatable and freely slidable manner.

Figure 8:
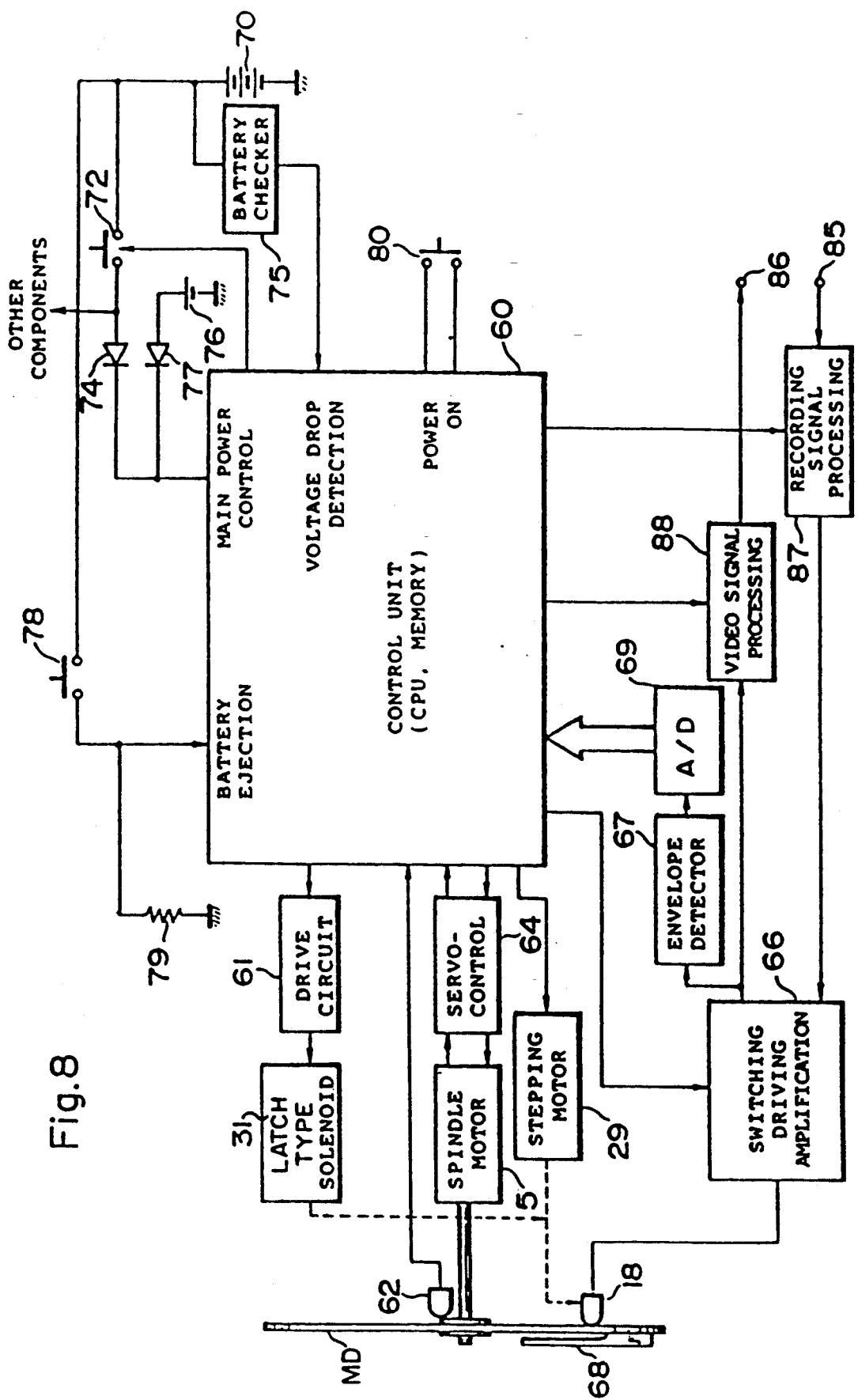
FIG. 8 is a circuit diagram illustrating the electrical construction of a magnetic recording/playback apparatus.

FIG. 8 illustrates the electrical construction of a magnetic recording/playback apparatus.

The operation of each of the components constituting the magnetic recording/playback apparatus, as well as the overall operation of the apparatus, is under the control of a control unit 60. The latter comprises a central processor, preferably a microprocessor (hereafter referred to as a "CPU"), a memory for storing a program run by the CPU and necessary data, and an interface for providing a connection to peripheral elements, circuits and devices.

A spindle motor 5 is subjected to feedback control by a servo-control circuit 64 so as to be rotated at a constant speed, e.g. 3,600 rpm. The servo-control circuit 64 is also adapted to start and stop the motor 5 in response to commands from the control unit 60. A phase detector 62 is provided so as to be close to the core of the magnetic disk MD. The phase detector 62 detects the magnetic flux of a permanent magnet for chucking, which flux leaks from a magnetic body (not shown) provided on the core of the magnetic disk MD, and generates a single pulse PG each time the magnetic disk MD makes one full revolution. The output pulses PG of the phase detector 62 are inputted to the control unit 60. Since the magnetic disk MD is rotated at a constant 3600 rpm in the illustrated embodiment, the magnetic head MD records on the disk, or plays back from the disk, a video signal corresponding to one track, namely a frequency-modulated video signal of one field, every revolution, i.e., every 1/60 of a second.

The magnetic head 18 is supported so as to be freely movable radially of the magnetic disk MD, and has its movement controlled in the same direction, by the head carriage 10 driven by the stepping motor 29, as set forth above. The control unit 60 instructs the stepping motor 29 with regard to the direction and amount of movement of the magnetic head 18.

Since video signal recording, etc., is carried out while the magnetic disk MD is rotating, the limiting plate 68 is provided in order to maintain proper contact between the magnetic head 18 and magnetic disk MD at all times.

The magnetic recording/playback apparatus is capable of inputting a signal and recording the signal on the magnetic disk MD (this is referred to as the recording mode). A video signal which enters at an input terminal 85 is subjected to frequency modulation and other processing by a recording signal processing circuit 87, after which the processed signal is applied to the magnetic head 18 via a circuit 66 for switching, drive and amplification. If the magnetic recording/playback apparatus is an electronic still video camera, the video signal applied to the input terminal 85 is obtained by an imaging operation relying upon an imaging optical system that includes a solid-state electronic imaging element.

The magnetic recording/playback apparatus of this embodiment is capable also of playing back a video signal recorded on the magnetic disk MD. The switching, driving and amplifying circuit 66 is adapted to switch between the recording mode and a playback mode under the control of the control unit 60.

In the playback mode, the playback output of the magnetic head 18 is amplified by the switching, driving and amplifying circuit 66 and then fed into a video signal processing circuit 88 and an envelope detector circuit 67. The video signal processing circuit 88 subjects the video signal read by the magnetic head 18 to signal processing to produce a composite video color signal in e.g. an NSTC format. The color video signal outputted by the circuit 88 is applied to a color television system (not shown) having a cathode-ray tube display (CRT) and a CRT control circuit. A still picture produced by a video signal recorded on the magnetic disk MD appears visually on the screen of the CRT.

The envelope detector circuit 67 detects the envelope of the signal read by the magnetic head 18, namely the envelope of the frequency-modulated video signal recorded on a track of the magnetic disk MD, and outputs a voltage signal conforming to the detected envelope. This voltage signal representing the envelope is fed into an analog/digital (A/D) converter 69, which proceeds to convert the signal into an eight-bit digital signal representing a quantization level of e.g. 256. This signal enters the control unit 60.

The envelope detection signal is used to search for unrecorded tracks on the magnetic disk MD and to detect the center positions of recorded tracks. Specifically, if the level of a detected signal does not attain a predetermined threshold level when the magnetic head 18 crosses a track, then that particular track has not been recorded on. In the recording mode, the recording of a video signal, which is obtained by photographing a subject, onto the magnetic disk MD is usually performed by recording the signal on an outermost unrecorded track searched for as described above (though there are exceptions). In the playback mode, the magnetic head 18 is fed incrementally over short distances radially of the magnetic disk MD, and a position at which the detected signal peaks is construed to be the center of a track on which a video signal has been recorded. The video signal is played back with the magnetic head 18 being positioned on the center of this track.

The latch-type solenoid 31 is driven by a drive circuit 61 under the control of the control unit 60.

In addition to controlling the rotation of the magnetic disk MD and the recording/playback of video signals, the control unit 60 reads signals from various switches, controls camera operation based on the results of the read signals, and executes head loading and unloading processing, described below.

A main battery (main power supply) 70 is provided in order to supply the control unit 60 and other components constituting the magnetic recording/playback apparatus with operating power. The output voltage of the main battery is supplied to the various components through a main power supply control switch 72, and to the control unit 60 through a diode 74. Connected to the main battery 70 is a battery checker 75 for detecting that the output voltage of the main battery 70 has fallen below a predetermined voltage. When this has been detected, the battery checker 75 delivers a signal indicative of the fact to the control unit 60. Also applied to the control unit 60 is a detection signal, which indicates ejection of the main battery 70, that arrives from an ejection sensing switch 78 closed by ejecting the main battery 70 from the apparatus. The operation of switch 78 will be described in detail hereinbelow.

A power supply switch (e.g., a push-button switch) 80 is connected to the control unit 60. In response to a switch-on signal from the power supply switch 80, the control unit 60 controls the on/off operation of the main power supply control switch 72.

An auxiliary battery (auxiliary power supply) 76 is provided in order to supply the control unit 60 with operating power when the main power supply control switch 72 is off. The output side of the auxiliary battery 76 is connected to the control unit 60 via a diode 77. When the main power supply control switch 72 is off, the main control unit 60 is held in the stand-by state by the auxiliary battery 76. When there is an input from the power supply switch 80, the main control unit 60 is started and responds by closing the main power supply control switch 72. When the power supply switch 80 is pressed again so that an input arrives from this switch, the control unit 60 opens the switch 72 and returns to the stand-by state.

Figure 9:
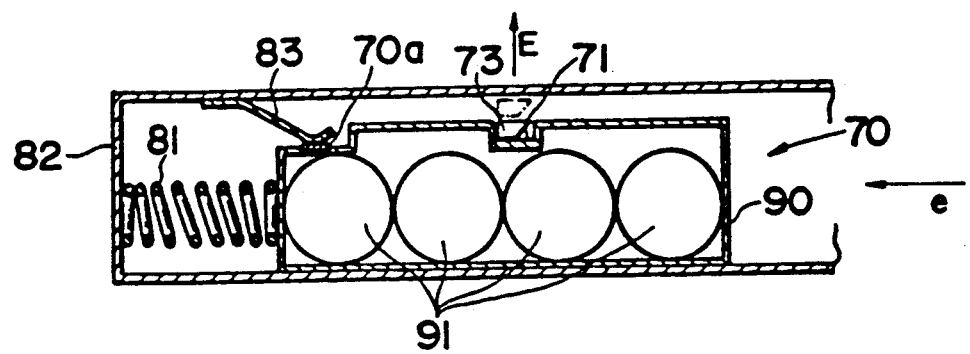
Figure 10:
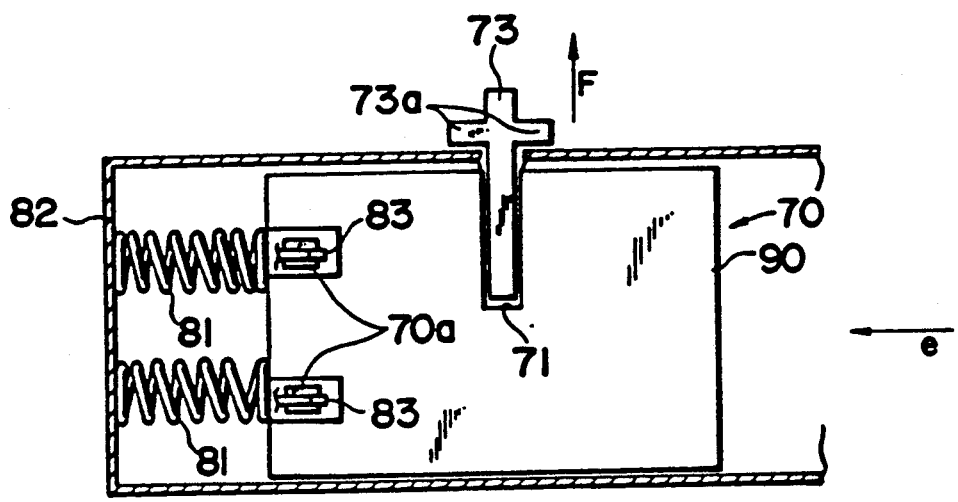

FIGS. 9 and 10 illustrate the manner in which the main battery 70 is accommodated.

The main battery 70 comprises a case 90 and a plurality (four in this embodiment) of dry cells 91 accommodated within the case 90. It is also permissible to use a main battery 70 of the type in which the dry cells 91 are not internally accommodated. Positive (+) and negative (−) terminals 70a are provided in exposed formed in respective recesses formed in the upper edge portion of the case 90. A locking recess 71 extending from one side of the case 90 to its central portion is formed in the upper surface of the case substantially at the middle thereof.

The location of the magnetic recording/playback apparatus at which the main battery 70 is installed is provided with two counter springs 81 biasing the main battery 70, which is received at a predetermined position, in an ejecting direction, terminals 83 contacting the terminals 70a of the main battery 70 received at the predetermined position, and a lock lever 73 fitted into the locking recess 71 for holding the main battery 70 at the predetermined position against the biasing forces of the counter springs 81. The portion of the lock lever 73 that is inserted into the recess 71 of main battery 70 is tapered in shape to facilitate the insertion of the lock lever 73. Protrusions 73a at the base portion of the lock lever 73 are for the purpose of actuating the ejection sensing switch 78, as will be described below.

When the battery 70 is inserted into its loading location of the magnetic recording/playback apparatus in the direction of arrow e, the tapered surface of the lock lever 73 contacts the upper surface of the case 90. As the battery 70 is inserted further, the lock lever 73 flexes in the direction of arrow E. As the battery 70 is inserted still further so as to overcome the biasing forces of the counter springs 81 secured to a base plate 82, the lock lever 73 fits itself into the recess 71 to lock the battery 70 at this position.

When the battery 70 is removed from its loading location, the lock lever 73 is moved in the direction of arrow F to disengage the lock lever 73 from the recess 71. As a result, the battery 70 is thrust out by the biasing forces of the counter springs 81.

Figure 11A:
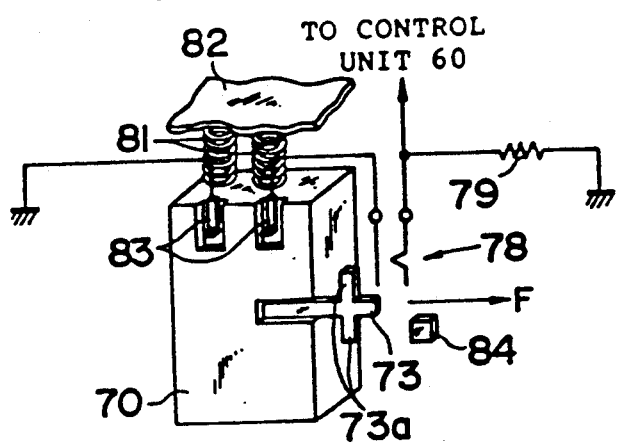
FIGS. 11a through 11c are circuit diagrams illustrating an example of a battery ejection sensing switch.
Figure 11B:
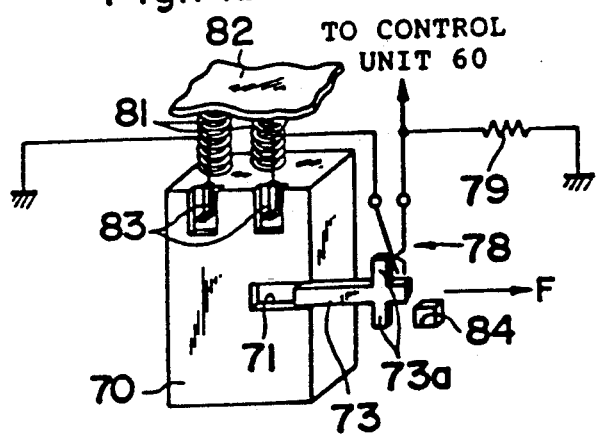
Figure 11C:
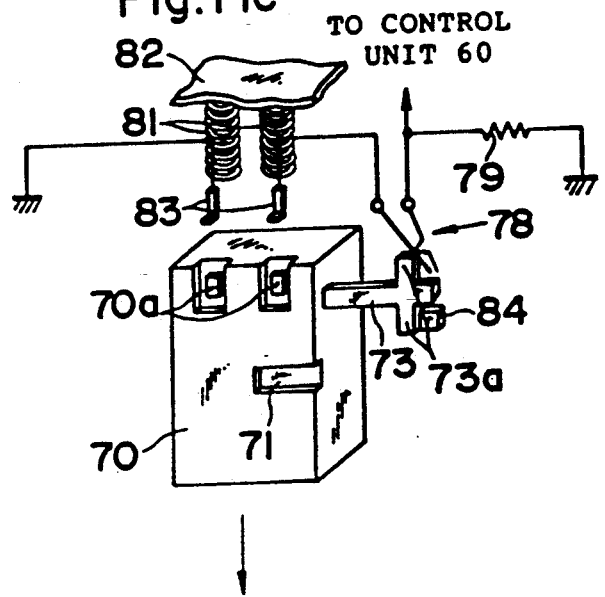

FIGS. 11a through 11c are circuit diagrams illustrating an example of the ejection sensing switch 78. FIG. 11a shows a state in which the main battery 70 is locked in place and the switch 78 is open, FIG. 11b a state in which the switch 78 is closed in the course of unlocking the battery 70, and FIG. 11c a state in which the main battery 70 is in the process of being ejected by completely unlocking the battery 70.

The ejection sensing switch 78 is composed of two contacts disposed in the vicinity of the protrusions 73a of the lock lever 73. When the main battery 70 is loaded and locked in its loading location of the magnetic recording/playback apparatus, as shown in FIG. 11a, the two contacts of the ejection sensing switch 78 are spaced away from each other; hence, the switch 78 is open. When the lock lever 73 is moved in the direction of arrow F in order to eject the main battery 70, as shown in FIG. 11b, the protrusion 73a of the lock lever 73 pushes one of the contacts constituting the ejection sensing switch 78, thereby closing the ejection sensing switch 78. With the ejection sensing switch 78 thus in the closed state, the main battery 70 is kept locked by the lock lever 73 and the terminals 83 are in contact with the terminals 70a of case 90. Accordingly, an ON signal indicating closure of the switch 78 is delivered from this switch to the control unit 60, whereby ejection of the main battery 70 is sensed. At disengagement (unlocking) of the main battery 70, the battery is thrust out of the apparatus by the biasing forces of the counter springs 81. At this time, the ejection sensing switch 78 remains closed. However, since the terminals 83 are separate from the terminals 70a of the case 90, the signal inputted to the control unit 60 turns off without the voltage of main battery 70 being supplied to the switch 78.

A stopper 84 is provided in the vicinity of the ejection sensing switch 78. When the protrusion 73a of the lock lever 73 abuts against the stopper 84, this limits the movement of the lock lever 73.

Figure 12:
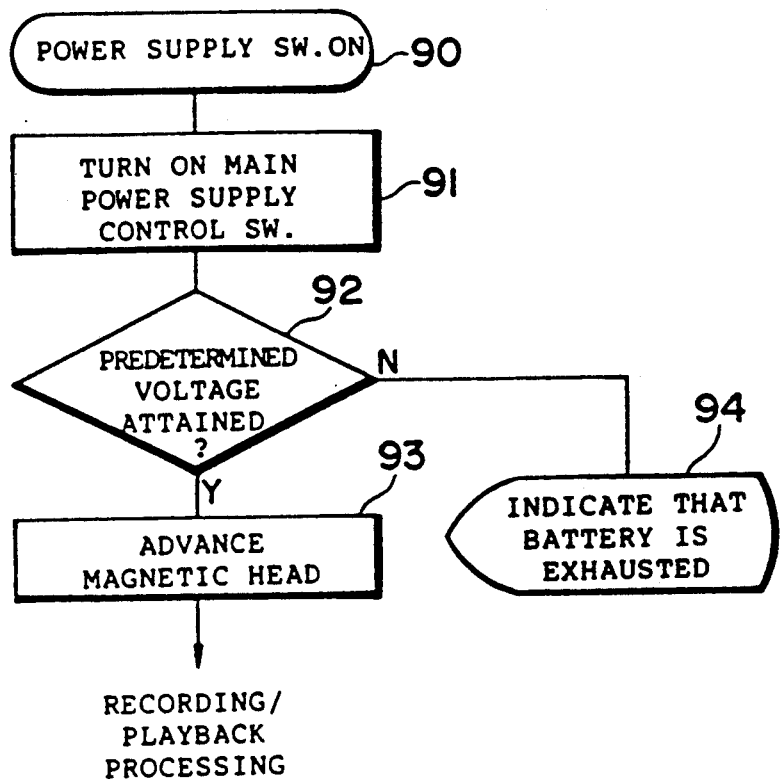
FIG. 12 is a flowchart illustrating a processing procedure for advancing a magnetic head.

FIG. 12 is a flowchart illustrating the processing procedure for advancing the magnetic head 18 toward the magnetic disk MD (head loading).

When the power supply switch 80 of the magnetic recording/playback apparatus is closed at step 90, the main power supply control switch 72 is closed by the control unit 60 at step 91. The control unit 60 then changes over from the stand-by state to the started state. When the voltage of the power supply 70 is above a predetermined voltage and a drop in the battery voltage is not detected by the battery checker 75 (YES at step 92), the latch-type solenoid 31 is driven by the control unit 60 via the drive circuit 61. As a result, the oscillating member 33 is turned through a predetermined angle in the reverse direction and is thereby shifted to the stop position. The head carriage 10 is moved by the force of spring 23 in a direction which will move the magnetic head 18 to the magnetic disk MD (head loading) at step 93. If the output voltage of the main battery 70 is less than the predetermined voltage, a drop in voltage is detected by the battery checker 75. Thus, a NO answer is received at step 92 even if the power supply switch 80 is closed. This means that head loading is not carried out. Instead, an indication is given at step 94 that the battery has run out.

Figure 13:
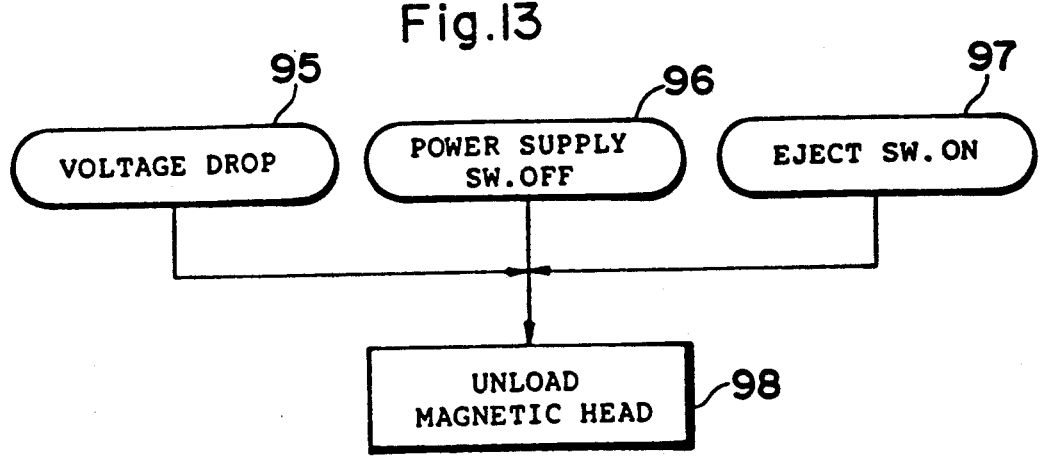
FIG. 13 is a flowchart illustrating a processing procedure for retracting the magnetic head.

FIG. 13 is a flowchart illustrating the processing procedure for retracting the magnetic head 18 from the magnetic disk MD (head unloading).

When the main power supply control switch 72 is closed and the control unit 60 has been started, a drop in voltage is detected by the battery checker 75 at step 95. When the power supply switch 80 is pressed opening of the main power supply switch 72 is detected at step 96. When the battery 70 is ejected, the ejection detection signal is outputted and detected at step 97 by the ejection sensing switch 78, as described above. When any one of the operations of steps 95, 96, 97 is performed, the latch-type solenoid 31 is driven by the control unit 60 via the driver circuit 61. As a result, the oscillating member 33 fixed to the output shaft 37 is shifted to the operating position by being rotated through a predetermined angle (e.g., +10° by positive pulses). The head carriage 10 moves against the force of the spring 23 in a direction which will separate the magnetic head 18 from the magnetic disk MD (head unloading) at step 98.

The opening of the main power supply switch at step 96 includes a case in which the power supply is turned off automatically when the magnetic recording/playback apparatus is not operated over a predetermined period of time (as when keys on the apparatus are not pressed over a predetermined period of time). The head carriage 10 moves in a direction which will separate the magnetic head 18 from the magnetic disk MD, in the manner described above, when power is turned off automatically as just set forth.

As many apparently widely different embodiments of the present invention can be made without departing from the spirit and scope thereof, it is to be understood that the invention is not limited to the specific embodiments thereof except as defined in the appended claims.

What is claimed is:

1. A magnetic recording/playback apparatus for a rotating magnetic recording medium, comprising:
bistable magnetic head advancing/retracting means, responsive to supply of driving power, for advancing a magnetic head to an engaged position in contact with the rotating magnetic recording medium and for retracting said magnetic head to a disengaged position away from the rotating magnetic recording medium, and for stably holding said magnetic head at said engaged position or said disengaged position in the absence of supply of said driving power, said bistable magnetic head advancing/retracting means comprising
engagement means, positionable to be urged down upon a horizontal surface of a head carriage of said magnetic head, for retracting said magnetic head to a disengaged position from said rotating magnetic recording medium, and
a latch-type solenoid, responsive to supply of said driving power, for stably holding said engagement means in one of a first position and a second position, and for enabling said engagement means to disengage said magnetic head from said rotating magnetic recording medium upon oscillation to said second position and to release said horizontal surface of said head carriage upon oscillation to said first position so that said magnetic head is engaged with said rotating magnetic recording medium;

detecting means for detecting attainment of a state in which a system power supply of the magnetic recording/playback apparatus is of a voltage capable of supplying said driving power to said magnetic head advancing/retracting means and attainment of a state in which said system power supply is cut off; and means responsive to detection performed by said detecting means for executing control of said latch-type solenoid so that said magnetic head is advanced to said engaged position or retracted to said disengaged position when the state is attained in which said system power supply is of a voltage capable of supplying said driving power to said magnetic head advancing/retracting means and is retracted to said disengaged position when the state is attained in which said system power supply is cut off.

2. The magnetic recording/playback apparatus of claim 1, wherein said detecting means detects attainment of the state in which said system power supply is of a voltage capable of supplying said driving power, when output voltage of a battery serving as said system power supply exceeds a predetermined value and a power supply switch is closed.

3. The magnetic recording/playback apparatus of claim 1, wherein said detecting means detects attainment of the state in which said system power supply is cut off when either said system power supply is turned off, an output voltage of a battery serving as said system power supply is less than a predetermined value, or said battery is removed from the apparatus.

4. The magnetic recording/playback apparatus of claim 1, wherein the magnetic recording medium is a magnetic disk which is inserted upon a disk plate, said magnetic head is advanced to engage with an underside of said magnetic disk.

5. The magnetic recording/playback apparatus of claim 4, said head carriage comprising:
- a sliding portion including a recess running parallel along a radial direction in which said magnetic head is advanced along said magnetic disk during recording/playback;
- a threaded lead screw housed within said recess and mounted rotatably to an apparatus base plate exteriorly of said recess; and
- a sliding needle engaging said threaded lead screw and said head carriage for advancing said head carriage along a radial direction during recording/playback, said sliding pin actuable upon rotation of said threaded lead screw by a drive motor.

6. The magnetic recording/playback apparatus of claim 5, further comprising:
- a first leaf spring, coupled to an underside of said head carriage, for upwardly biasing said head carriage away from said base plate; and
- a first mounting base mounted upon said base plate including protruding second leaf springs extending therefrom cooperable with an upward portion of said head carriage for biasing said head carriage downward, wherein a vertical range of motion of said head carriage is limited by said first and second leaf springs.

7. The magnetic recording/playback apparatus of claim 6, further comprising:
- a pair of second mounting bases mounted upon said base plate on an exterior side of said head carriage opposite a side of said first mounting base;
- a pair of third leaf springs respectively mounted and protruding downward from said pair of second mounting bases; and
- a rod, urged downward upon said horizontal surface of said head carriage by said pair of third leaf springs at respective first and second ends thereof, for stably supporting said head carriage on said exterior side in either of said first or second positions.

8. A magnetic recording/playback apparatus for a rotating magnetic recording medium, comprising:
bistable magnetic head advancing/retracting means, responsive to supply of a driving power, for advancing a magnetic head to an engaged position in contact with the rotating magnetic recording medium and for retracting said magnetic head to a disengaged position away from the rotating magnetic recording medium, and for stably holding said magnetic head at said engaged position or said disengaged position in the absence of supply of said driving power, said bistable magnetic head advancing/retracting means comprising
engagement means, positionable to be urged down upon a horizontal surface of a head carriage of said magnetic head, for retracting said magnetic head to the disengaged position from said rotating magnetic recording medium, and
a latch-type solenoid, responsive to supply of said driving power, for stably holding said engagement means in one of a first position an da second position, and for enabling said engagement means to disengage said magnetic head from said rotating magnetic recording medium upon oscillation to said second position and to release said horizontal surface of said head carriage upon oscillation to said first position so that said magnetic head is engaged with said rotating magnetic recording medium;
detecting means for detecting attainment of a state in which a system power supply of the magnetic recording/playback apparatus is of a voltage capable of supplying said driving power to said magnetic head advancing/retracting means and attainment of a state in which said system power supply is cut off; and
means responsive to detection performed by said detecting means for executing control of said latch-type solenoid so that said magnetic head is advanced to said engaged position or retracted to said disengaged position when the state is attained in which said system power supply is of a voltage capable of supplying said driving power to said magnetic head advancing/retracting means and is retracted to said disengaged position when the state is attained in which said system power supply is cut off,
said latch-type solenoid being driven by said driving power which is supplied as positive and negative pulses which respectively rotate an output shaft of said latch-type solenoid in opposite first and second directions to said first and second positions, said output shaft being stably held in said first and second positions after application of said positive and negative pulses.

9. The magnetic recording/playback apparatus of claim 8, wherein the magnetic recording medium is a magnetic disk which is inserted upon a disk plate, said magnetic head is advanced to said engaged position to be in contact with only an underside of said magnetic disk.

10. The magnetic recording/playback apparatus of claim 9, said head carriage comprising:
- a sliding portion including a recess running parallel along a radial direction in which said magnetic head is advanced along said magnetic disk during recording/playback;
- a threaded led screw housed within said recess and mounted rotatably to an apparatus base plate exteriorly of said recess; and
- a sliding pin engaging said threaded lead screw and said head carriage for advancing said head carriage along a radial direction during recording/playback, said sliding pin actuable upon rotation of said threaded lead screw by a drive motor.

11. The magnetic recording/playback apparatus of claim 10, further comprising:
- a first leaf spring, coupled to an underside of said head carriage, for upwardly biasing said head carriage away from said base plate; and
- a first mounting base mounted upon said base plate including protruding second leaf springs extending therefrom cooperable with an upward portion of said head carriage for biasing said head carriage downward, wherein a vertical range of motion of said head carriage is limited by said first and second leaf springs.

12. The magnetic recording/playback apparatus of claim 11, further comprising:
- a pair of second mounting bases mounted upon said base plate on an exterior side of said head carriage opposite a side of said first mounting base;
- a pair of third leaf springs respectively mounted and protruding downward from said pair of second mounting bases; and
- a rod, urged downward upon said horizontal surface of said head carriage by said pair of third leaf springs at respective first and second ends thereof, for stably supporting said head carriage on said exterior side in either of said first or second positions.

13. A method of operating a recording/playback apparatus for rotating a magnetic disk comprising the steps of:
- mounting the magnetic disk upon a disk plate within the apparatus;
- transporting a magnetic head during recording/playback along a radial direction across an underside of the mounted magnetic disk by rotating a threaded lead screw, housed within a recessed portion of a head carriage disposed parallel along the radial direction in which the magnetic head is transported, the lead screw mounted on a base plate of the head carriage exteriorly of the recess to be rotatably driven by a drive motor, a sliding needle, including opposing first and second ends which are embedded within the head carriage, engaging the threaded lead screw for transporting the head carriage in response to rotation of the threaded lead screw; and
- advancing and retracting the magnetic head with respect to the magnetic disk to be respectively in an advanced position and a retracted position, the magnetic head being advanced toward the magnetic disk by releasing an engagement member of advancing/retracting means from a horizontal surface of the head carriage via an output shaft of a latch-type solenoid held in a first position responsive to of a negative pulse of a driving power supply and being retracted from said magnetic disk by engagement of the engagement member of the advancing/retracting means with the horizontal surface of the head carriage when the output shaft of the latch-type solenoid is held in a second position responsive to a positive pulse of the driving power.

14. The method of operating a recording/playback apparatus of claim 13, said advancing and retracting step further comprising driving the latch-type solenoid to be in the first position or second position when an output voltage of a battery, serving to supply the pulses of the driving power, is capable of exceeding a first predetermined level and a power switch is activated and driving the latch-type solenoid to be in the second position when either the power switch is deactivated, the output voltage of the battery falls below a second predetermined level, or the battery is removed from the apparatus.

* * * * *